AIRCRAFT INERTIAL DRIFT CORRECTION BY A GROUND STATION
Filed Nov. 21, 1967
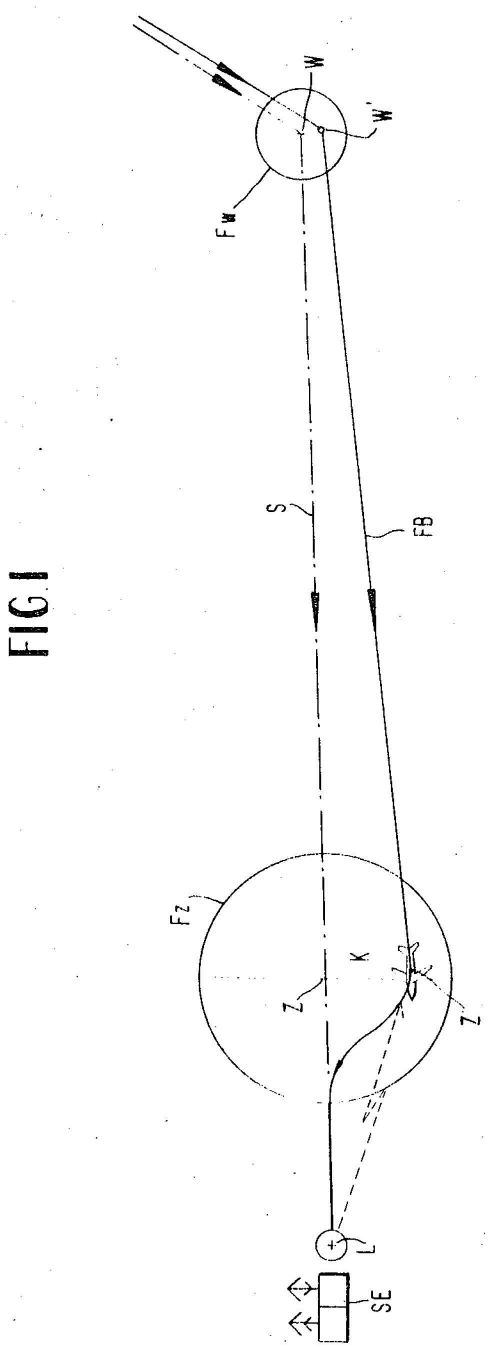
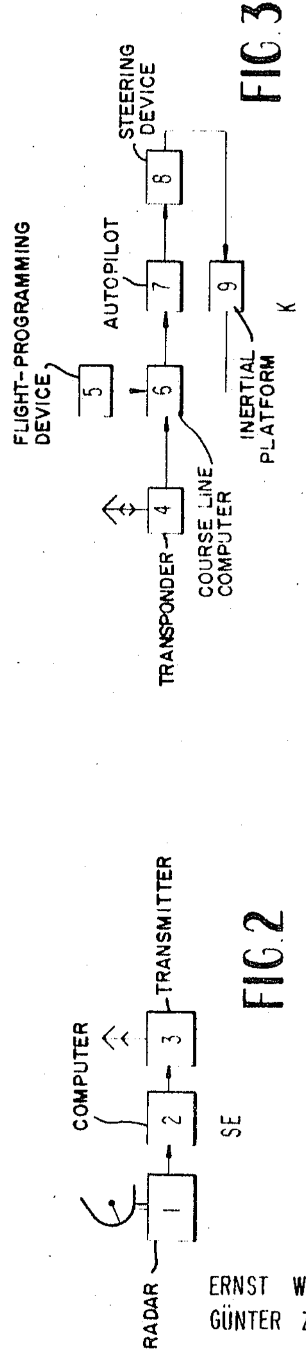
INVENTORS
ERNST WIELAND
GÜNTER ZIMMERMANN
BY James E. Bryan
ATTORNEY United States Patent Office 3,456,255
Patented July 15, 1969

1

3,456,255
AIRCRAFT INERTIAL DRIFT CORRECTION BY A GROUND STATION

Ernst Wieland, Langenargen, and Günter Zimmermann, Friedrichshafen, Germany, assignors to Dornier System G.m.b.H., Friedrichshafen, Germany, a limited-liability corporation of Germany Filed Nov. 21, 1967, Ser. No. 684,736
Claims priority, application Germany, Nov. 26, 1966, D 51,655
Int. Cl. G01s 9/02
U.S. Cl. 343—5 8 Claims

ABSTRACT OF THE DISCLOSURE

This invention relates to a position-finding and guidance system for an aircraft employing an inertial navigation system which comprises means in the aircraft for compensating and correcting the inertial navigation system for drift, and means on the ground for determining the actual position of the aircraft and for computing a correction value by comparison with the theoretical aircraft position, the inertial navigation system being compensated and corrected in accordance with the correction value.

This invention relates to a position-finding and guiding system for an aircraft which is equipped with an inertial navigation system. It is well known that aircraft or moving objects, such as submarines, for example, may be guided by means of inertial navigation. This type of control has the disadvantage, however, that within a specific length of time it includes a drift which is not specifically known with respect to amount and direction under variable conditions.

The system of inertial navigation includes as a principal element a centrifugal or gyro platform having, for example, three gyroscopes for the three principal directions. These gyroscopes have a certain drift, the amount and direction of which are not known precisely under variable conditions. This drift acts in a manner such that the ideal case, in which the instantaneous position of the aircraft can be determined on the basis of direction, time and velocity, is affected by an error. Thus, the aircraft having completed a flight time of one hour must be located within a range of approximately 3 kilometers, which results from the drift inherent in the system and which drift, as noted above, is not exactly known with respect to amount and direction. If it is now intended that an aircraft, after having flown for one hour and having completed a mission, be landed in order to evaluate the results of the mission and in order to recover the aircraft itself, the range indicated with the diameter of 3 kilometers may be too large for a good landing and a safe recovery operation.

Accordingly, the present invention reduces this range to a very small area in a manner as nearly predetermined as possible. In accordance with the present invention, a position-finding and guidance system is employed which compensates and corrects the inertial navigation system in the drift thereof a short time prior to landing, particularly a programmed landing, from a ground station which has determined the actual position on the basis of a bearing and which has computed a correction value by comparison with the theoretical position, this compensation and correction of the drift being effected by virtue of the correction value. It is thus rendered possible to subsequently reduce the range, which previously had a diameter of about three kilometers, to a circular area of about 50 meters. After the correction has been made, the aircraft will steer toward the landing area where it is

2 brought down to the ground either by parachute recovery or in a conventional manner.

Several possibilities exist for effecting the correction of the flight path. A radar set, for example, is required for determining the uncorrected position of the aircraft at a specifically defined instant. Suitable therefor are both primary and secondary radar sets; the latter necessitates the use of a transponder within the aircraft. A primary radar which operates with the aid of the reflected radiation of its own signal indicates any aircraft; a secondary radar operating on two frequencies indicates only the aircraft in which the matching transponder is operative. For this reason, and for several other reasons which will be set forth below, a secondary radar set is considerably more advantageous for the present system. Thus, the transponder needs to be turned on automatically by the flight-programming device only in an assumed range or radius of action of the radar. The transmitter of the transponder, being now turned on and from which signals are received on the ground by the receiver of the radar set, will then automatically turn on the transmitter of the radar set. The distance and the azimuth angle as well as the angle of elevation then may be accurately measured. The data thus obtained automatically indicate the instantaneous position of the aircraft. The actual values obtained then can be compared with the theoretical values in a computer and from these it is possible to determine the necessary course-correcting data. These data thereafter may be transmitted by radio to the flight-programming device which will accordingly compensate the drift of the gyro platform by superposition of the correcting data with respect to the flight program still to be completed. It is not absolutely mandatory that a separate transmitter be used therefor, instead, the radar transmitter itself may carry out this transmission.

In the aircraft, these signals are received either by a specific receiver or by the transponder and are transmitted to the programming device. The transponder transmitter also may be used for transmitting various measuring results from the aircraft to the ground station; one example is the transmission of altitude.

A correction of this type takes approximately one second. At any rate, the time required is so short that only slight possibilities of disturbances by an outlying station are produced. Moreover, only a minimum of radio communications from both the aircraft and from the ground station are necessary, which again considerably increases the safety factor against taking bearings from other extraneous sources.

The system of the present invention will be further illustrated by reference to the accompanying drawings in which—

FIGURE 1 is a schematic illustration of the course of a programmed flight path and the correction necessary therefore, and FIGURES 2 and 3 are schematic illustrations of the instruments required for carrying out the method of the present invention.

Indicated in FIGURE 1 with dashed-dotted lines is the desired or required flight path S which is previously programmed by a programming device. The actual flight path, which results from errors due to the drift of the gyroscopic platform, is shown in full lines. The desired flight path leads, for example toward the end of the flying mission, to a last turning point W from which the landing point L is intended to be approached. Because of the aforementioned drift, however, the aircraft will not arrive precisely at the turning point W but will be located near the desired turning point W within an error circle $F_w$. Accordingly, the aircraft executes its last programmed turn, for example, at the point W′. Also, the further flight of the aircraft presumably will be affected by an error which can not be predicted in advance. The actual flight path FB will, therefore, be separate and divergent from the direct flight path S also in the last portion and will not lead directly to the landing point L. For this reason, a homing point Z outside of the landing point is chosen at a distance such that the aircraft K arriving there can be detected with known means or so that the precise location thereof can be determined with other means.

Around this homing point Z is again an error circle $F_z$ within which the aircraft will arrive despite the drift. As soon as the gyroscopic platform has established that the previously programmed homing point Z has apparently been reached, the position finding operation for the aircraft by the ground station SE is initiated by a radio signal from the aircraft K. The aircraft K itself will assume the position Z′ at this time because of the drift and will be located in this position from the ground station SE. The radio communication and the position-finding operation have been indicated in the drawing with the aid of the dashed arrow. A correction signal is formed from the position-finding data of the ground station and is transmitted by radio to the aircraft K. An automatic compensation of the desired and the actual coordinates is effected there and the aircraft turns into position on the prescribed desired direction of approach S to the landing point L.

FIGURES 2 and 3 illustrate schematic embodiments of the instruments required for performing the method of the present invention. The ground station SE consists of a direction-finding installation, for example a radar 1, for determining the actual position coordinates, in other words, the actual position of the aircraft. It is immaterial in the present invention whether a primary radar or a secondary radar is used for this purpose. It is necessary merely that the receiving device on board the aircraft be selected accordingly and be constructed as a transponder in the case of a secondary radar on the ground. The actual position coordinates of point Z′ are determined by the radar 1 according to a $\rho$(rho)-$\theta$(theta)-$\phi$(phi) process. In a ground computer 2, these values are compared with the theoretical aircraft position and the error signals are transmitted to the aircraft K by way of the transmitter 3 to effect inertial drift correction.

The aircraft contains a flight-programming device 5 which relays the control or steering commands to the steering or guiding system and also to the autopilot 7 by way of a navigation or course-line computer 6. From the latter, the steering commands act upon the steering or control device 8 of the aircraft. The inertial platform 9 continuously determines the position coordinates as Cartesian coordinates and transmits then, in turn, to the navigation or course-line computer 6.

Within the area of the target, the transmitter, for example of the transponder 4, of the aircraft is turned on, as described above, due to the program of the flight-programming device 5 and will initiate by virtue of its radio signal the position-finding or homing operation of the ground station SE. By way of the transmitting and receiving installation of the transponder 4, the actual coordinates received from the ground are fed to the navigation or course-line computer 6 and are evaluated or utilized therein as correction signals. Independently of the manner in which the position-finding method is initiated and carried out, it is possible according to the system described herein to correct the inertial platform from the ground and in flight, and the aircraft may be brought to the desired flight path from its pre-programmed but error-affected flight path and within closest proximity to the predetermined landing point.

It will be obvious to this skilled in the art that many modifications may be made within the scope of the present invention without departing from the spirit thereof, and the invention includes all such modifications.

What is claimed is:

1. A position-finding and guidance system for an aircraft employing an inertial navigation system which comprises means in the aircraft for compensating and correcting the inertial navigation system for drift, and means on the ground for determining the actual position of the aircraft and for computing a correction value by comparison with the theoretical aircraft position, the inertial navigation system being compensated and corrected in accordance with the correction value.

2. A system according to claim 1 in which the means on the ground comprises a primary radar station and a separate transmitter for transmitting correction signals.

3. A system according to claim 2 including correction computer means coupled to the primary radar station.

4. A system according to claim 2 in which the means in the aircraft comprises a receiver which influences a programming means, the latter effecting a correction of an inertial platform.

5. A system according to claim 1 in which the means on the ground comprises a secondary radar means and the means in the aircraft comprises a transponder means adapted to transmit information signals to the secondary radar means on the ground.

6. A system according to claim 5 in which the transponder means is actuated by a flight-programming means, and the transponder means actuates the transmitter of the secondary radar means.

7. A system according to claim 6 including means in the aircraft for receiving signals from the secondary radar means, and means for superimposing the signals on data of an uncompleted flight plan.

8. A method for compensating and correcting an aircraft inertial navigation system for drift which comprises determining the actual position of the aircraft from a ground station for a short period of time and computing a correction value at the ground station by comparison with the theoretical aircraft position, and compensating and correcting the inertial navigation system in accordance with the correction value.

References Cited

UNITED STATES PATENTS 3,008,668 11/1961 Darlington.

3,028,592 4/1962 Parr et al. -------- 343—9 X

RICHARD A. FARLEY, Primary Examiner

M. F. HUBLER, Assistant Examiner

U.S. Cl. X.R.

235—150.25; 244—3.14, 3.20